(12) United States Patent
Kida

(10) Patent No.: US 9,714,032 B2
(45) Date of Patent: Jul. 25, 2017

(54) DRIVING ASSISTANCE APPARATUS

(71) Applicant: TOYOTA JIDOSHA KABUSHIKI KAISHA, Toyota-shi (JP)

(72) Inventor: Akihiro Kida, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/915,057

(22) PCT Filed: Aug. 26, 2014

(86) PCT No.: PCT/IB2014/001620
§ 371 (c)(1),
(2) Date: Feb. 26, 2016

(87) PCT Pub. No.: WO2015/028866
PCT Pub. Date: Mar. 5, 2015

(65) Prior Publication Data
US 2016/0207532 A1    Jul. 21, 2016

(30) Foreign Application Priority Data

Aug. 30, 2013    (JP) .................................. 2013-180504

(51) Int. Cl.
*B60W 30/09*  (2012.01)
*B60W 30/08*  (2012.01)
(Continued)

(52) U.S. Cl.
CPC ............ *B60W 30/09* (2013.01); *B60W 10/04* (2013.01); *B60W 10/18* (2013.01); *B60W 30/08* (2013.01);
(Continued)

(58) Field of Classification Search
CPC .. B60W 10/04; B60W 10/18; B60W 2520/10; B60W 2520/105; B60W 2540/18; B60W 2550/10; B60W 2550/302; B60W 2550/308; B60W 2710/0616; B60W 2710/18; B60W 30/08; B60W 30/09
USPC .............................................. 701/1, 36, 301
See application file for complete search history.

(56) References Cited

U.S. PATENT DOCUMENTS 5,631,639 A * 5/1997 Hibino ............... B60K 31/0008
180/167
5,754,099 A   5/1998 Nishimura et al.
(Continued)

FOREIGN PATENT DOCUMENTS

DE  10 2005 057 251 A1  6/2007
JP       2003-259358 A   9/2003
(Continued)

OTHER PUBLICATIONS

International Search Report Issued Jan. 5, 2015 in PCT/IB14/01620 Filed Aug. 26, 2014.

*Primary Examiner* — Tyler J Lee
(74) *Attorney, Agent, or Firm* — Oblon, McClelland, Maier & Neustadt, L.L.P.

(57) ABSTRACT

A driving assistance apparatus to be mounted on a vehicle includes: an object detecting unit configured to detect an object outside the vehicle and acquire object information including a distance to the object; a vehicle speed detecting unit configured to detect a vehicle speed of the vehicle; and a processing unit configured to carry out driving assistance associated with an object on the basis of the object information when the object has been detected by the object detecting unit, and suppress the driving assistance when a predetermined condition that is changed on the basis of the vehicle speed detected by the vehicle speed detecting unit is satisfied.

7 Claims, 5 Drawing Sheets

(51) Int. Cl.
*B60W 10/04* (2006.01)
*B60W 10/18* (2012.01)

(52) U.S. Cl.
CPC ... *B60W 2520/10* (2013.01); *B60W 2520/105* (2013.01); *B60W 2540/18* (2013.01); *B60W 2550/10* (2013.01); *B60W 2550/302* (2013.01); *B60W 2550/308* (2013.01); *B60W 2710/0616* (2013.01); *B60W 2710/18* (2013.01)

(56) References Cited

U.S. PATENT DOCUMENTS

| | | | |
|---|---|---|---|
| 8,126,609 B2 * | 2/2012 | Kimura | B60K 26/021 701/29.2 |
| 2004/0073367 A1 | 4/2004 | Altan et al. | |
| 2004/0145460 A1 * | 7/2004 | Taniguchi | B60Q 9/008 340/435 |
| 2009/0207079 A1 | 8/2009 | Samukawa et al. | |
| 2011/0241858 A1 | 10/2011 | Tsuzuki | |
| 2014/0200799 A1 * | 7/2014 | Sugano | B62D 15/027 701/301 |

FOREIGN PATENT DOCUMENTS

| | | |
|---|---|---|
| JP | 2009-192422 A | 8/2009 |
| JP | 2011-122607 A | 6/2011 |
| JP | 2011-215002 A | 10/2011 |
| JP | 2012-061932 A | 3/2012 |

* cited by examiner

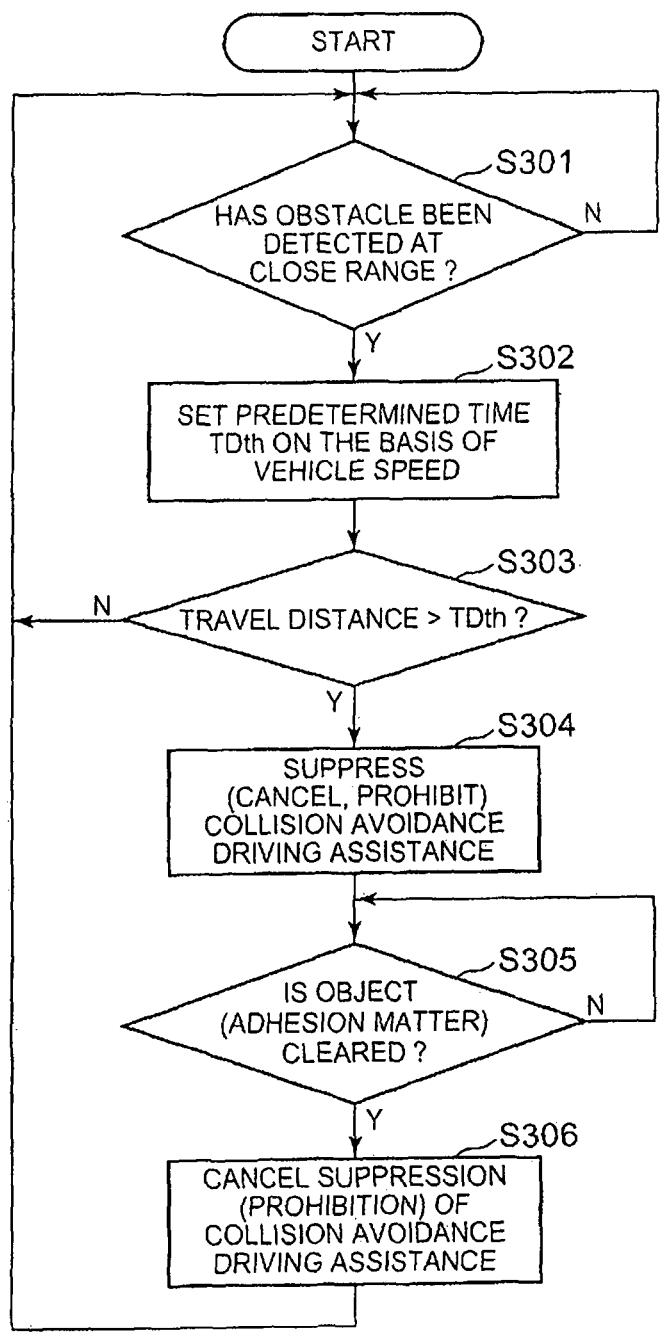

DRIVING ASSISTANCE APPARATUS

BACKGROUND OF THE INVENTION

1. Field of the Invention

The invention relates to a driving assistance apparatus.

2. Description of Related Art

There is known a driving assistance apparatus that includes object detecting means (an ultrasonic sensor, a millimeter wave radar, or the like) for detecting an object around a host vehicle and that, for example, when a distance to an object is shorter than or equal to a predetermined distance, executes automatic braking control, or the like, irrespective of driver's operation to avoid a collision (see, for example, Japanese Patent Application Publication No. 2011-122607 (JP 2011-122607 A) and Japanese Patent Application Publication No. 2012-061932 (JP 2012-061932 A)).

Incidentally, the above-described object detecting means is generally provided outside a vehicle, so snow, or the like, may adhere to the object detecting means during traveling. If snow, or the like, adheres to the object detecting means, the object detecting means may detect the adhesion snow, or the like, that is not an original collision avoidance target, which may interfere with driving assistance.

Therefore, there has been suggested a technique for determining whether there is adhesion of snow (see, for example, Japanese Patent Application Publication No. 2011-215002 (JP 2011-215002 A)). In JP 2011-215002 A, when the length of a reverberation wave received by an ultrasonic sensor is larger than or equal to a threshold, it is determined that snow has adhered to a location around the ultrasonic sensor.

However, in JP 2011-215002 A, a determination as to whether there is adhesion of snow is carried out under an operating condition (another vehicle speed range) different from an operating condition (vehicle speed range) in which an object that is a collision avoidance target is detected. That is, it is not possible to determine whether it is adhesion matter, such as snow, or a hard obstacle at a close range on the basis of only the reverberation wave.

SUMMARY OF THE INVENTION

The invention provides a driving assistance apparatus that is able to determine whether there is adhesion of snow, or the like, to object detecting means and reduce interference with driving assistance due to adhesion of snow, or the like.

A first aspect of the invention provides a driving assistance apparatus to be mounted on a vehicle. The driving assistance apparatus includes: an object detecting unit configured to detect an object outside the vehicle and acquire object information including a distance to the object; a vehicle speed detecting unit configured to detect a vehicle speed of the vehicle; and a processing unit configured to carry out driving assistance associated with an object on the basis of the object information when the object has been detected by the object detecting unit, and suppress the driving assistance when a predetermined condition that is changed on the basis of the vehicle speed detected by the vehicle speed detecting unit is satisfied.

In the above aspect, the condition may include a first condition and a second condition, the first condition may be that a distance that the vehicle has traveled in a state where the object has been continuously detected by the object detecting unit exceeds a predetermined distance, the second condition may be that a time during which the object has been continuously detected by the object detecting unit exceeds a predetermined time, and the processing unit may be configured to select the first condition when the vehicle speed detected by the vehicle speed detecting unit is lower than or equal to a predetermined speed, and select the second condition when the vehicle speed detected by the vehicle speed detecting unit exceeds the predetermined vehicle speed.

In the above aspect, the predetermined distance may be a distance to the object at the time when the object detecting unit starts detecting the object.

In the above aspect, the predetermined condition may be that a time during which the object has been continuously detected by the object detecting unit exceeds a predetermined time, and the predetermined time is changed on the basis of the vehicle speed detected by the vehicle speed detecting unit.

In the above aspect, the predetermined time may extend as the vehicle speed detected by the vehicle speed detecting unit increases.

In the above aspect, the predetermined condition may be that a distance' that the vehicle has traveled in a state where the object has been continuously detected by the object detecting unit exceeds a predetermined distance, and the predetermined distance may be changed on the basis of the vehicle speed detected by the vehicle speed detecting unit.

In the above aspect, the predetermined distance may extend as the vehicle speed detected by the vehicle speed detecting unit increases.

In the above aspect, the object detecting unit may be configured to transmit a detection wave to an outside of the vehicle, detect an object outside the vehicle on the basis of a reflected wave of the detection wave, and acquire the object information.

According to the above aspect, it is possible to provide the driving assistance apparatus that is able to determine whether there is adhesion of snow, or the like, to object detecting means and reduce interference with driving assistance due to adhesion of snow, or the like.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a flowchart that illustrates the operation of a driving assistance apparatus according to a third embodiment.

DETAILED DESCRIPTION OF EMBODIMENTS

Hereinafter, embodiments of the invention will be described with reference to the accompanying drawings.

First Embodiment

Figure 1:
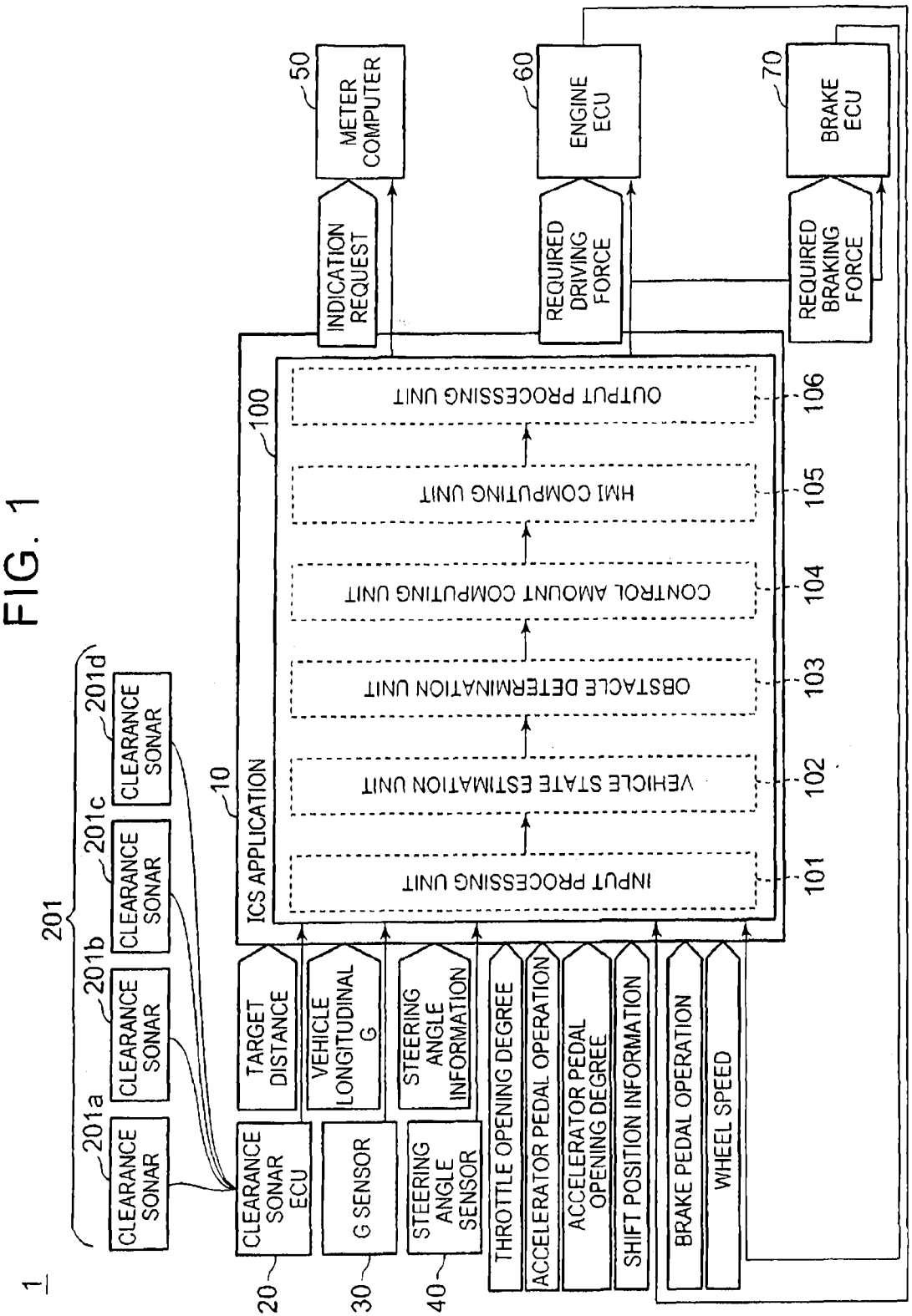
FIG. 1 is a block diagram that shows an example of a system configuration including a driving assistance apparatus.

FIG. 1 is a block diagram that shows an example of a system configuration including a driving assistance apparatus 1 according to the present embodiment.

As shown in FIG. 1, the driving assistance apparatus 1 includes a driving assistance ECU 10.

The driving assistance ECU 10 is formed of a microcomputer, and includes, for example, a ROM, a readable/rewritable RAM, a timer, a counter, an input interface, an output interface, and the like. The ROM stores control programs. The RAM stores computed results, and the like. The function of the driving assistance ECU 10 may be implemented by any one of hardware, software and firmware or a combination of any two or more of them. For example, selected part or all of the function of the driving assistance ECU 10 may be implemented by an application-specific integrated circuit (ASIC) or a field programmable gate array (FPGA). Part or all of the function of the driving assistance ECU 10 may be implemented by another ECU (for example, a clearance sonar ECU 20). The driving assistance ECU 10 may be configured to implement part or all of the function of another ECU (for example, the clearance sonar ECU 20).

The clearance sonar ECU 20, clearance sonars 201a, 201b, 201c, 201d, a G sensor 30, a steering angle sensor 40, a meter computer 50, an engine ECU 60, a brake ECU 70, and the like, may be connected to the driving assistance ECU 10. For example, the driving assistance ECU 10 may be communicably connected to the clearance sonar ECU 20, the G sensor 30, the steering angle sensor 40, the meter computer 50, the engine ECU 60 and the brake ECU 70 via an in-vehicle LAN, such as a controller area network (CAN), direct wires, or the like.

Each of the clearance sonars 201a, 201b, 201c, 201d is an ultrasonic sensor, and is provided at an appropriate location of a vehicle body. Each of the clearance sonars 201a, 201b, 201c, 201d is an example of a sensor that detects the presence or absence of an object, having a relatively close detection distance of, for example, several centimeters to several meters, or a distance to the object. For example, the two clearance sonars 201a, 201b may be provided at a front bumper, and the two clearance sonars 201c, 201d may be provided at a rear bumper. The number and arrangement of the sensors are not limited to these configurations. For example, sensors may be provided such that four sensors are provided at the front, four sensors are provided at the rear and two sensors are further provided at the sides. Each of the clearance sonars 201a to 201d outputs a detected result (object information) within a corresponding one of detection ranges to the clearance sonar ECU 20.

Each of the clearance sonars 201a, 201b, 201c, 201d may be configured to operate when a vehicle speed falls within a low-speed range higher than 0. The clearance sonars 201a, 201b for detecting an object ahead of the vehicle may be configured to operate at the time when the vehicle travels in accordance with a forward drive range (for example, D range). The clearance sonars 201c, 201d for detecting an object behind the vehicle may be configured to operate at the time when the vehicle travels in accordance with a reverse range (at the time when the vehicle travels backward). Each of the clearance sonars 201a, 201b, 201c, 201d may be configured to execute ultrasonic wave transmission/reception process at each predetermined interval. The predetermined interval may be set on the basis of a detection distance. For example, the predetermined interval extends when the detection distance is increased, whereas the predetermined interval shortens when the detection distance is reduced.

The clearance sonar ECU 20 processes the detected result input from each of the clearance sonars 201a to 201d, and calculates a "target distance" that is a distance to an object. The clearance sonar ECU 20 transmits information about the calculated target distance (distance information) to the driving assistance ECU 10. For example, the clearance sonar ECU 20 may measure a distance to an object by measuring a time that is taken for an ultrasonic wave irradiated from any one of the clearance sonars to reflect from the object and return to the any one of the clearance sonars as the reflected wave. When the detection angle of each clearance sonar is a wide range of, for example, 90°, the direction of an object is not identified only on the basis of the detected result from a single clearance sonar. In this case, for example, the clearance sonar ECU 20 may identify the location (direction) of an object by obtaining distances from the plurality of clearance sonars to the object. The clearance sonar ECU 20 may determine the shape of an object (for example, a shape like a wall or a shape like a utility pole).

The G sensor 30 measures the longitudinal acceleration of the vehicle, and transmits the measured result to the driving assistance ECU 10 as information about "vehicle longitudinal G". The longitudinal acceleration of the vehicle, which is measured by the G sensor 30, is a resultant value of an acceleration that is calculated from a wheel speed and an acceleration of gravity due to the gradient of a road (the inclination of the vehicle). Thus, it is possible to measure the gradient of a road by subtracting an acceleration, which is calculated from a wheel speed, from the vehicle longitudinal G that is measured by the G sensor 30.

The steering angle sensor 40 detects the steering angle of a steering wheel, and transmits the steering angle to the driving assistance ECU 10 as steering angle information.

A combination meter instrument (not shown) that informs a driver by indication, an information sound generating device (not shown) that informs the driver by voice, or the like, is connected to the meter computer 50. The meter computer 50 controls numeric values, characters, graphics, indicator lamps, and the like, that are displayed on the combination meter instrument in response to a request from the driving assistance ECU 10, and controls alarm sound or alarm voice that is issued from the information sound generating device.

The engine ECU 60 is to control the operation of an engine that is a driving source for the vehicle, and controls, for example, ignition timing, fuel injection amount, throttle opening degree, and the like. The engine ECU 60 controls engine output on the basis of a required driving force from the driving assistance ECU 10 (described later). In the case of a hybrid vehicle, the engine ECU 60 may control driving force in response to the required driving force from the driving assistance ECU 10 in cooperation with an HVECU (not shown) that controls an overall hybrid system. In the case of a hybrid vehicle or an electric vehicle, motor output may be controlled on the basis of a required driving force from the driving assistance ECU 10.

The engine ECU 60 may transmit information about accelerator pedal operation, information about accelerator opening degree, information about throttle valve opening degree and shift position information may be transmitted to the driving assistance ECU 10. The information about accelerator pedal operation indicates the operation amount of the accelerator pedal (not shown). The information about accelerator opening degree indicates the accelerator opening degree. The information about throttle valve opening degree indicates the throttle opening degree. The shift position information indicates the position of a shift lever, and is P (parking), R (reverse), N (neutral), D (drive), or the like. The shift position information may include, for example, a drive mode, such as a sporty mode and a snow mode, a status of use of adaptive cruise control (ACC), or the like. The information about accelerator pedal operation may be directly acquired from an accelerator position sensor. The information about throttle valve opening degree may be directly acquired from a throttle sensor provided in a throttle body. The shift position information may be, acquired from an ECU that controls a transmission or may be directly acquired from a shift position sensor.

The brake ECU 70 is to control a braking system of the vehicle, and controls, for example, a brake actuator that actuates a hydraulic brake device arranged in each wheel (not shown). The brake ECU 70 controls the output of the brake actuator (wheel cylinder pressure) on the basis of a required braking force from the driving assistance ECU 10 (described later). The brake actuator may include a pump that generates a high-pressure oil (and a motor that drives the pump), various valves, and the like. Any hydraulic circuit configuration of the braking system may be employed. The hydraulic circuit of the braking system just needs to be configured to be able to increase each wheel cylinder pressure irrespective of the driver's depression amount of the brake pedal. Typically, the hydraulic circuit may include a high-pressure hydraulic source (a pump or an accumulator that generates high-pressure oil) other than a master cylinder. A circuit configuration that is typically used in a brake-by-wire system that is represented by an electric control brake system (ECB) may be employed. In the case of a hybrid vehicle or an electric vehicle, motor output (regenerative operation) may be controlled on the basis of a required braking force from the driving assistance ECU 10.

The brake ECU 70 may transmit information about brake pedal operation and information about wheel speed to the driving assistance ECU 10. The information about wheel speed may be, for example, based on a signal from a wheel speed sensor provided at each wheel (not shown). The speed or acceleration (or deceleration) of the vehicle (vehicle body speed) is allowed to be calculated from the information about wheel speed. The information about brake pedal operation may be directly acquired from a brake depression force switch or a master cylinder pressure sensor. Similarly, the information about wheel speed (or information about vehicle speed) may be directly acquired from a wheel speed sensor, a drive shaft rotation sensor, or the like.

The driving assistance. ECU 10 includes an intelligent clearance sonar (ICS) application 100. In the example shown in FIG. 1, the ICS application 100 is software that runs in the driving assistance ECU 10, and includes an input processing unit 101, a vehicle state estimation unit 102, an obstacle determination unit 103, a control amount computing unit 104, a human machine interface (HMI) computing unit 105 and an output processing unit 106.

The driving assistance ECU 10 carries out driving assistance associated with an object such that the host vehicle does not collide with the object on the basis of, for example, information from the clearance sonar ECU 20. The driving assistance may include an alarm that prompts driver's autonomous brake operation (in cooperation with the meter computer 50), intervening to suppress driving force (in cooperation with the engine ECU 60) and intervening to generate braking force (in cooperation with the brake ECU 70). In the present embodiment, when a predetermined condition is satisfied, that is, when it is determined that snow, or the like, has adhered to any one of the clearance sonars 201*a* to 201*d*, the above-described driving assistance is suppressed. The details of the driving assistance according to the present embodiment and suppression of the driving assistance will be described later.

The input processing unit 101 executes the process of inputting various pieces of information, which are received by the driving assistance ECU 10. For example, information that is received in conformity with the CAN communication standard is converted to information that is usable in the ICS application 100. The distance information from the clearance sonar ECU 20, the information about the vehicle longitudinal G from the G sensor 30, and the steering angle information from the steering angle sensor 40 are input from the input processing unit 101. The information about accelerator pedal operation, the information about accelerator opening degree, the information about throttle valve opening degree and the shift position information are input from the engine ECU 60 to the input processing unit 101. The information about brake pedal operation and the information about wheel speed are input from the brake ECU 70.

The vehicle state estimation unit 102 includes the function of estimating a vehicle state on the basis of the above-described various pieces of information, input to the input processing unit 101. For example, the vehicle state estimation unit 102 may determine whether a vehicle state in which the clearance sonars 201*a* to 201*d* should operate has been established.

The obstacle determination unit 103 carries out collision determination on an object detected by the clearance sonars 201*a* to 201*d* on the basis of, for example, object information associated with the object. Specifically, the obstacle determination unit 103 determines whether there is a high possibility of a collision of the detected object with the host vehicle (whether a collision with the object should be avoided by driving assistance). For example, the obstacle determination unit 103 may determine that the host vehicle collides with the object when a distance to the object is shorter than a predetermined distance, a deceleration required to avoid a collision with the object (required deceleration) is higher than a predetermined threshold TH and the object is located in a range in which the object is unavoidable through steering operation. The determination may be carried out on the basis of object information regarding the object, which is detected by the clearance sonars 201*a* to 201*d*, steering information received from the steering angle sensor 40, wheel speed information received from the brake ECU 70, and the like.

The obstacle determination unit 103 may determine whether an object detected by the clearance sonars 201*a* to 201*d* is an obstacle intended for driving assistance on the basis of the target distance received from the clearance sonar ECU 20. For example, each of pieces of object information, detected by the clearance sonars 201*a* to 201*d*, may be generated because of the presence of an object that cannot be an obstacle (such as snow adhered to the clearance sonars 201*a* to 201*d*). Therefore, it is determined whether the object information detected by the clearance sonars 201*a* to 201*d* indicates an obstacle intended for driving assistance (obstacle determination). A specific obstacle determination method will be described later.

The control amount computing unit 104 computes a control amount in driving assistance. For example, when the obstacle determination unit 103 has determined that the host vehicle collides with the detected object, a required braking force based on the above-described required deceleration may be computed. The control amount computing unit 104 may compute a required driving force for suppressing driving force when an object is located within a predetermined distance. The control amount computing unit 104 may compute a required driving force for setting the driving force to "0" when it has been determined that the host vehicle collides with the detected object.

The control amount computing unit 104 suppresses driving assistance when it has been determined that the detected object is not an obstacle intended for driving assistance as a result of obstacle determination made by the obstacle determination unit 103 (the object is adhesion matter, such as snow). That is, the control amount computing unit 104 computes a control amount for suppressing the driving assistance. Suppressing the driving assistance may include cancelling the driving assistance in execution and prohibiting the driving assistance. For example, when it has been determined that the detected object is not an obstacle intended for driving assistance at the timing at which interventional braking force is generated, the control amount computing unit 104 may compute the required braking force to 0 in order to cancel driving assistance (interventional braking). While the object that is not an obstacle intended for driving assistance has been continuously detected by the clearance sonars 201a to 201d, the control amount computing unit 104 may compute a driving force corresponding to an accelerator opening degree (during normal times) as the required driving force in order to prohibit driving assistance (interventional braking).

The HMI computing unit 105 is a computing unit for outputting various pieces of information for reminding the driver of the object when the intended object is detected by the clearance sonars 201a to 201d. The HMI computing unit 105, for example, carries out computation for providing notification by a display device, an audio device, a vibration device, or the like (not shown), to the driver through the meter computer 50.

The HMI computing unit 105 suppresses driving assistance, which is carried-out through the meter computer 50, when it has been determined that the detected object is not an obstacle intended for driving assistance (the object is adhesion matter, such as snow) through obstacle determination made by the obstacle determination unit 103. That is, the HMI computing unit 105 carries out computation for suppressing driving assistance. For example, when it has been determined that the detected object is not an obstacle intended for driving assistance at the timing at which an alarm that prompts driver's autonomous brake operation is sounded, the HMI computing unit 105 may carry out computation for cancelling driving assistance (alarm) or providing notification that the alarm is incorrect. While the object that is not an obstacle intended for driving assistance has been continuously detected by the clearance sonars 201a to 201d, the HMI computing unit 105 may carry out computation for prohibiting driving assistance (alarm, or the like).

The output processing unit 106, for example, converts computed results to signals conforming with the CAN communication standard and outputs the signals in order to transmit the control amounts (the required driving force and the required braking force) computed by the control amount computing unit 104 and the computed result (output information) computed by the HMI computing unit 105 to the engine ECU 60, the brake ECU 70 and the meter computer 50.

Next, a driving assistance flowchart that is executed by the driving assistance apparatus 1 according to the present embodiment, particularly, a flowchart from determination as to whether the object detected by the clearance sonars 201a to 201d is an obstacle intended for driving assistance to suppression of driving assistance, will be described.

Figure 2:
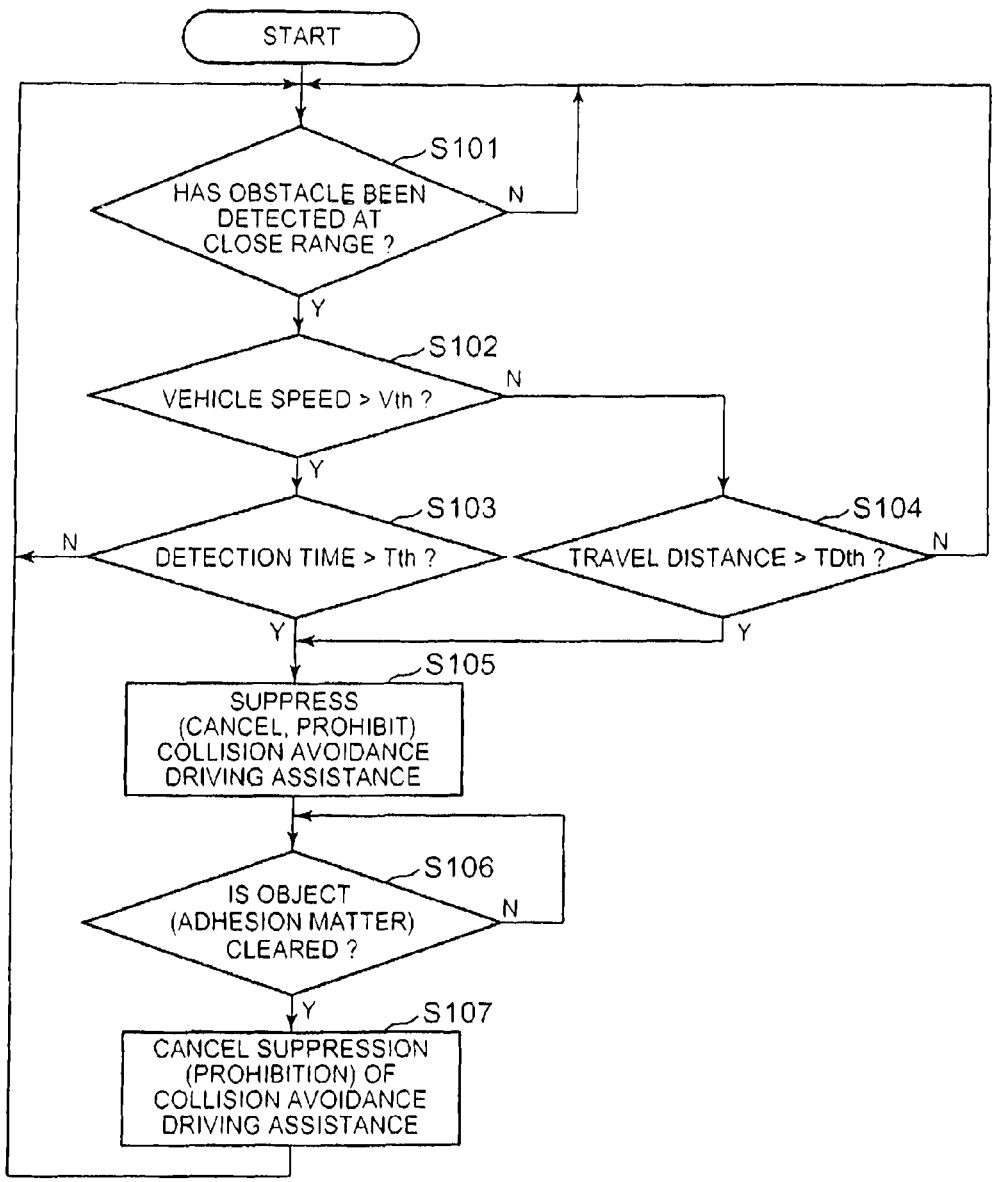
FIG. 2 is a flowchart that illustrates the operation of the driving assistance apparatus according to a first embodiment.

FIG. 2 is a flowchart that illustrates the operation of the driving assistance apparatus 1. The processing routine shown in FIG. 2 may be started from when the ignition of the vehicle on which the driving assistance apparatus 1 is mounted is turned on and may be executed while the ignition is on. The processing routine shown in FIG. 2 may be executed at intervals (predetermined intervals) at which an ultrasonic wave is transmitted or received during operation of the clearance sonars 201a to 201d. The processing routine shown in FIG. 2 may be executed independently of distance information regarding each of the clearance sonars 201a to 201d. Hereinafter, the process that is executed on the distance information associated with the clearance sonar 201a will be described as an example.

In parallel with the flowchart shown in FIG. 2, driving assistance (intervening to generate braking force, intervening to suppress driving force, issuing an alarm that prompts brake operation, or the like) in the case where an object has been detected by the clearance sonars 201a to 201d is being carried out.

In step S101, the driving assistance ECU 10 (obstacle determination unit 103) determines whether an object has been detected by the clearance sonars 201a to 201d at a close range. Specifically, the driving assistance ECU 10 determines whether distance information that indicates the target distance shorter than or equal to a predetermined distance D0 has been obtained on the basis of the distance information from the clearance sonar ECU 20. The distance information including the target distance shorter than or equal to the predetermined distance D0 may be distance information regarding an object that is input for the first time. That is, this may be the case where no object has been detected (no distance information has been obtained) in the last interval, distance information has been obtained in the current interval and the target distance included in the distance information is shorter than or equal to the predetermined distance D0. The distance information including the target distance shorter than or equal to the predetermined distance D0 may be distance information regarding an object that has been input from an interval at or before the last time. That is, this may be the case where the same object has been detected (distance information has been obtained) also in the interval at or before the last time and the target distance included in the distance information obtained in the current interval becomes shorter than or equal to the predetermined distance D0 for the first time. The predetermined distance D0 may correspond to the maximum value of the range of the target distance that is obtained at the time when snow has adhered to any one of the clearance sonars 201a to 201d, and may be, for example, a distance shorter than or equal to 50 cm.

In step S101, when the distance information including the target distance shorter than or equal to the predetermined distance D0 has been obtained, the process proceeds to step S102; otherwise, the process in the current interval ends, and enters a standby state where the process of step S101 is repeated until distance information shorter than or equal to the predetermined distance D0 is obtained.

In step S102, the driving assistance ECU 10 (obstacle determination unit 103) determines whether the speed of the host vehicle is higher than a predetermined speed Vth on the basis of the wheel speed information input from the brake ECU 70. When the speed of the host vehicle is higher than the predetermined speed Vth, the process proceeds to step S103. When the speed of the host vehicle is lower than or equal to the predetermined speed Vth, the process proceeds to step S104.

Step S103 or step S104 is a step of determining whether the object detected by the clearance sonar 201a is an obstacle intended for driving assistance, that is, whether the detected object is adhesion matter, such as snow.

In step S103, the driving assistance ECU 10 (obstacle determination unit 103) determines whether a time (detection time) during which the object detected by the clearance sonar 201a at a close range (within the predetermined distance D0) has been continuously detected exceeds a predetermined time T1th. When the object has been continuously detected for a certain time (predetermined time T1th) from when the object has been detected within the predetermined distance D0, because the host vehicle has been continuously able to travel without a collision with the close-range object, it may be determined that the detected object is adhesion matter. The detection time may be a time during which the object has been continuously detected within the predetermined distance D0 or may be a time during which the object has been continuously detected at any distance including the case where the object has been detected within the predetermined distance D0 and then the object falls outside the predetermined distance D0. The detection time may include an index that indicates the continuity of a time during which the object has been detected, that is, for example, (the number of) intervals in which the object has been continuously detected by the clearance sonar 201a. When the object has not been detected temporarily in a certain interval, the detection time may be reset to 0 or the time of the interval in which the object has not been detected may be shortened. That is, assuming, for example, the case where no distance information has been obtained because of noise, temporary communication error, or the like, the definition of the detection time may be loosened such that the detection time does not become 0 at once when the object has not been detected temporarily.

Figure 3A:
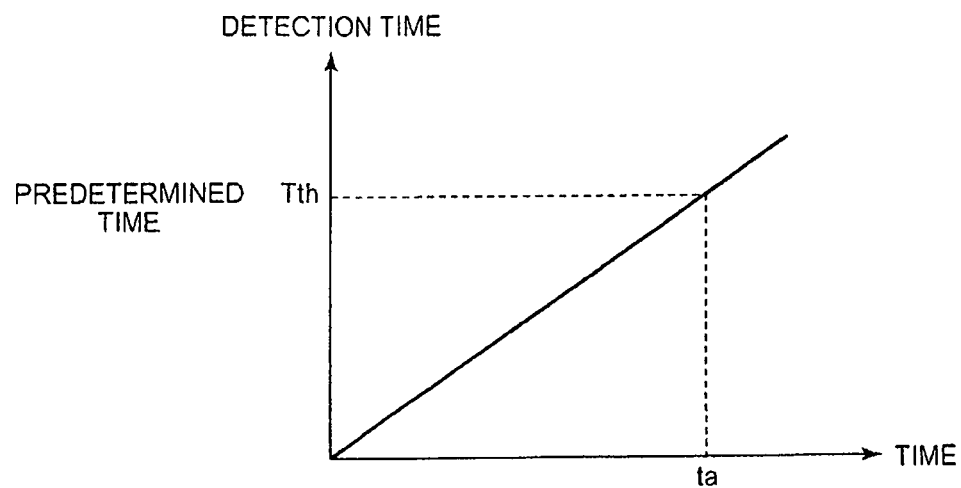
FIG. 3A and FIG. 3B are time charts that illustrate an example of the operation of the driving assistance apparatus according to the first embodiment.
Figure 3B:
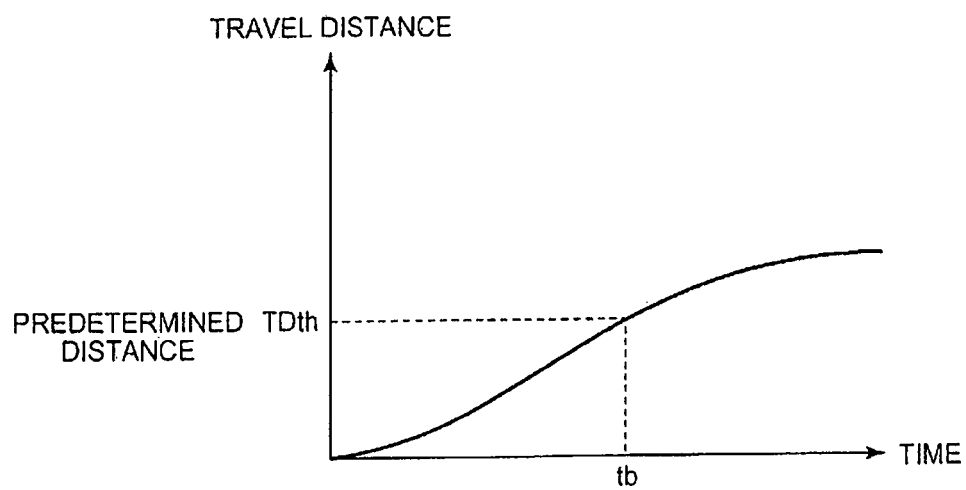

FIG. 3A and FIG. 3B are time charts that illustrate examples of the operation of the driving assistance apparatus 1, and are time charts that illustrate a determination as to whether the detected object is adhesion matter. FIG. 3A shows an example of a lapse of time of a detection time where the ordinate axis represents time (detection time) during which the detected object, has been continuously detected and the abscissa axis represents time. Time at which the object has been detected is set to 0. In this way, after time to at which the detection time exceeds the predetermined time T1th, it is allowed to be determined that the detected object is adhesion matter. As shown in FIG. 3A, when the object has been continuously detected, a detection time and a lapse of time linearly correspond to each other.

When the detection time is longer than the predetermined time T1th in step S103, that is, when it has been determined in step S103 that the object detected by the clearance sonar 201a is adhesion matter, the process proceeds to step S105. When the detection time is shorter than or equal to the predetermined time T1th, that is, when it has been determined that the object detected by the clearance sonar 201a is not adhesion matter, the process returns to step S101, and repeats the flowchart of step S101 to step S104.

In step S104, the driving assistance ECU 10 (obstacle determination unit 103) determines whether a distance (travel distance) that the host vehicle has moved in a state where the object detected by the clearance sonar 201a at a close range (within the predetermined distance D0) has been continuously detected exceeds a predetermined distance TD1th. When the host vehicle has traveled a certain distance (predetermined distance TD1th) in a state where an object has been continuously detected since the object is detected, because the host vehicle has been continuously able to travel without a collision with the close-range object, it may be determined that the detected object is adhesion matter. The predetermined distance TD1th may be, for example, the predetermined distance D0 or may be a distance to an object at the time when the clearance sonar 201a starts detecting the object within the predetermined distance D0.

FIG. 3A and FIG. 3B are time charts that illustrate examples of the operation of the driving assistance apparatus 1, and are time charts for illustrating a determination as to whether the detected object is adhesion matter. FIG. 3B shows an example of a travel distance with a lapse of time where the ordinate axis represents distance (travel distance) that the host vehicle has moved in a state where the object detected within the predetermined distance D0 has been continuously detected and the abscissa axis represents time. Time at which the object has been detected within the predetermined distance D0 is set to 0. In this way, after time tb at which the travel distance exceeds the predetermined distance TD1th, it is allowed to be determined that the detected object is adhesion matter.

When the travel distance exceeds the predetermined distance TD1th by using the clearance sonar 201a in step S104, that is, when it has been determined in step S104 that the object detected by the clearance sonar 201a is adhesion matter, the process proceeds to step S105. When the travel distance detected by the clearance sonar 201a is shorter than or equal to the predetermined distance TD1th, that is, when it has been determined that the object detected by the clearance sonar 201a is not adhesion matter, the process returns to step S101, and repeats the flowchart of step S101 to step S104.

In step S105, the driving assistance ECU 10 (control amount computing unit 104) suppresses driving assistance for avoiding a collision. For example, when driving assistance (intervening to generate braking force, intervening to suppress driving force, issuing an alarm that prompts brake, or the like) has been already carried out by the driving assistance ECU 10 on the basis of the object (adhesion matter) detected by the clearance sonar 201a, the driving assistance may be cancelled. After cancellation of the driving assistance, driving assistance may be prohibited. It may be determined whether to start the driving assistance after a determination of step S103 or step S104 is carried out. In this case, when it has been determined in step S103 or step S104 that the object is adhesion matter, the driving assistance may be prohibited by not starting the driving assistance. Suppressing driving assistance may include, for example, the case where the host vehicle is returned to a normal running state by reducing the amount of braking force generated through intervention or the amount of driving force suppressed through intervention in a stepwise manner. Suppressing driving assistance may include, for example, providing notification to the driver that driving assistance is suppressed. In this way, when it has been determined that the detected object is adhesion matter, it is possible to reduce a feeling of strangeness experienced by the driver by suppressing driving assistance for avoiding a collision.

In step S106, the driving assistance ECU 10 (obstacle determination unit 103) determines whether the object determined as adhesion matter is cleared (not detected anymore). Determination as to whether the adhesion matter is cleared may be carried out, for example, at the timing (in the interval) at which the object (adhesion matter) that has been continuously detected is not detected anymore or the timing at which a time during which the object has not been detected has elapsed the predetermined time (predetermined period) T0 since the object is not detected anymore. When it has been determined in step S106 that the object determined as adhesion matter is cleared, the process proceeds to step S107. When it has been determined that the object (adhesion matter) is not cleared, determination of step S106 is repeated until the object (adhesion matter) is cleared, and a state where driving assistance for avoiding a collision is suppressed (prohibited) is continued.

In step S107, the suppressed (prohibited) driving assistance for avoiding a collision is cancelled. The process returns to step S101, and waits until an object at a close range is detected.

Next, the operation of the driving assistance apparatus 1 (driving assistance ECU 10) according to the present embodiment will be described.

The driving assistance ECU 10 changes a condition for determining whether the detected object is adhesion matter (predetermined condition) on the basis of a vehicle speed, and suppresses driving assistance for avoiding a collision with the object detected in the case where the predetermined condition is satisfied (the object is adhesion matter). Thus, when the detected object is adhesion matter, driving assistance for avoiding a collision is suppressed, so it is possible to reduce a feeling of strangeness experienced by the driver by suppressing interventional braking, or the like, not intended by the driver.

More specifically, when the vehicle speed is higher than a predetermined speed Vth, the driving assistance ECU 10 determines that the detect object is adhesion mater when a time (detection time) during which the detected object has been continuously detected exceeds the predetermined time T1th, and suppresses driving assistance for avoiding a collision. When the vehicle speed is lower than or equal to the predetermined speed Vth, the driving assistance ECU 10 determines that the detected object is adhesion matter when a distance (travel distance) that the host vehicle has traveled in a state where the detected object has been continuously detected exceeds the predetermined distance TD1th, and suppresses driving assistance for avoiding a collision. Thus, it is possible to prevent erroneous determination in the case where it is determined whether it is adhesion matter on the basis of the travel distance of the host vehicle when the vehicle speed is high to some extent. That is, when the vehicle speed is high to some extent, the travel distance within one cycle of each of the clearance sonars 201a to 201d is long, so, for example, even when rain is detected only in a certain cycle, the travel distance of the host vehicle can exceed the predetermined distance TD1th during the cycle. Therefore, rain detected only in a certain cycle can be determined as adhesion matter. In contrast, when the vehicle speed is high (when the vehicle speed is higher than the predetermined speed Vth), it is possible to prevent the above-described erroneous determination by determining whether it is adhesion matter on the basis of a detection time. Driving assistance for avoiding a collision is not suppressed as a result of erroneous determination, so it is possible to effectively carry out driving assistance. If it is determined whether it is adhesion matter on the basis of the travel distance of the host vehicle irrespective of the vehicle speed, it is required to increase the predetermined distance TD1th in coordination with the case where the vehicle speed is high for the purpose of preventing the above-described erroneous determination. As a result, there occurs an inconvenience that a time required until it is determined whether the detected object is adhesion matter extends when the vehicle speed is low to some extent. However, by changing the condition for determining whether the detected object is adhesion matter between the case where the vehicle speed is high and the case where the vehicle speed is low, the above-descried inconvenience does not occur. That is, when the vehicle speed is low to some extent, it is possible to early determine whether the detected object is adhesion matter, so it is possible to reduce a feeling of strangeness experienced by the driver.

The predetermined distance TD1th may be a distance to the an object at the time when the clearance sonar 201a starts detecting the object. That is, when the vehicle has traveled the distance to the object detected at a close range (within the predetermined distance D0) without a collision thereafter, it may be determined that the detected object is adhesion matter, so it is possible to carry out determination as to adhesion matter in a minimum time. Thus, it is possible to early suppress (cancel, prohibit) driving assistance for avoiding a collision based on adhesion matter, so it is possible to early eliminate a feeling of strangeness experienced by the driver.

Second Embodiment

Next, a second embodiment will be described.

The present embodiment mainly differs from the first embodiment in that it is determined whether the detected object is adhesion matter on the basis of whether the detection time exceeds a predetermined time T2th and the predetermined time T2th is changed on the basis of the speed of the host vehicle. Hereinafter, like reference numerals denote similar component elements to those of the first embodiment, and the difference will be mainly described.

The system configuration of the driving assistance apparatus 1 according to the present embodiment is shown in FIG. 1 as in the case of the first embodiment, so the description thereof is omitted.

Next, a driving assistance flowchart that is executed by the driving assistance apparatus 1 according to the present embodiment, particularly, a flowchart from determination as to whether the object detected by the clearance sonars 201a to 201d is an obstacle intended for driving assistance to suppression of driving assistance, will be described.

Figure 4:
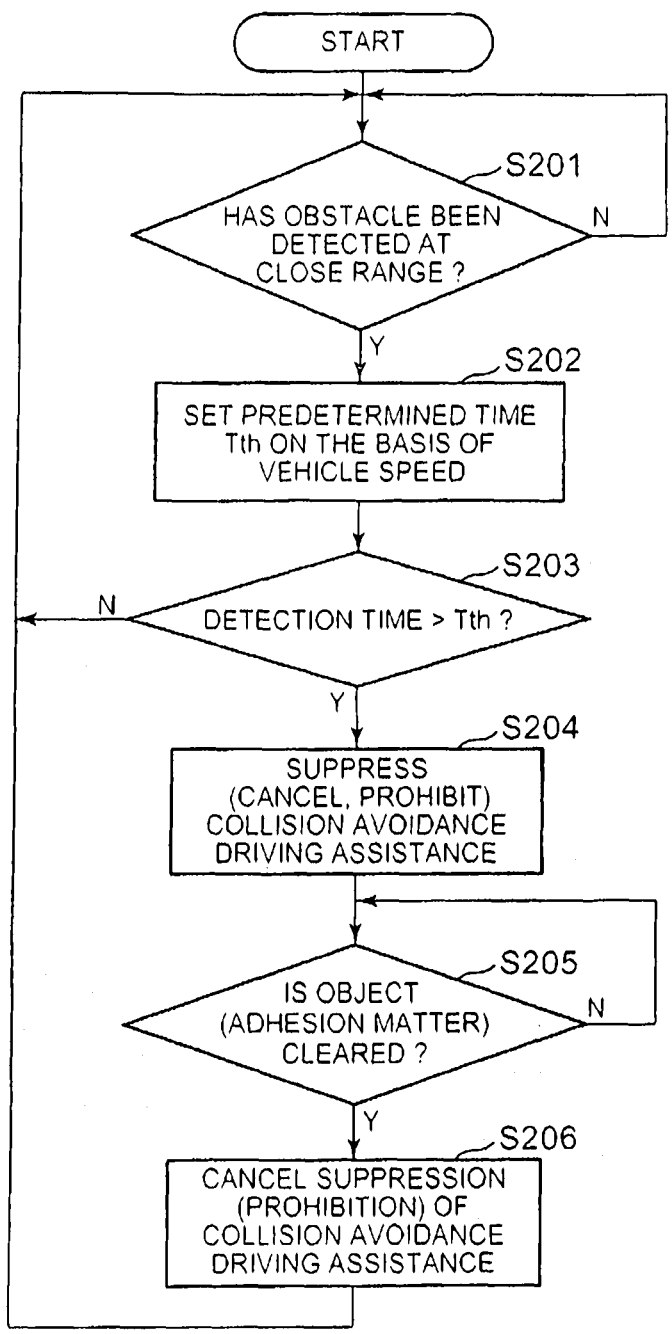
FIG. 4 is a flowchart that illustrates the operation of a driving assistance apparatus according to a second embodiment.

FIG. 4 is a flowchart that illustrates the operation of the driving assistance apparatus 1. The processing routine shown in FIG. 4 may be started from when the ignition of the vehicle on which the driving assistance apparatus 1 is mounted is turned on and may be executed while the ignition is on. The processing routine shown in FIG. 4 may be executed at intervals (predetermined intervals) at which an ultrasonic wave is transmitted or received during operation of the clearance sonars 201a to 201d. The processing routine shown in FIG. 4 may be executed independently of distance information regarding each of the clearance sonars 201a to 201d. Hereinafter, the process that is executed on the distance information associated with the clearance sonar 201a will be described as an example.

As in the case of the first embodiment, in parallel with the flowchart shown in FIG. 4, driving assistance (intervening to generate braking force, intervening to suppress driving force, issuing an alarm that prompts brake operation, or the like) in the case where an object has been detected by the clearance sonars 201a to 201d is being carried out.

In step S201, the driving assistance ECU 10 (obstacle determination unit 103) determines whether an object has been detected by the clearance sonar 201a at a close range (within the predetermined distance D0). This step is similar to step S101 shown in FIG. 2 according to the first embodiment, so the description is omitted.

In step S201, when the distance information including the target distance shorter than or equal to the predetermined distance D0 has been obtained, the process proceeds to step S202; otherwise, the process in the current interval ends, and enters a standby state where the process of step S201 is repeated until distance information shorter than or equal to the predetermined distance D0 is obtained.

In step S202, the driving assistance ECU 10 (obstacle determination unit 103) sets (changes) the predetermined time T2th on the basis of the speed of the host vehicle based on the wheel speed information input from the brake ECU 70, and then the process proceeds to step S203. The predetermined time T2th is a determination threshold for determining in the next step S203 whether the detected object is adhesion matter. Specifically, the predetermined time T2th may be set so as to be shortened as the vehicle speed decreases (the predetermined time T2th may be set so as to be extended as the vehicle speed increases).

Step S203 is a step of determining whether the object detected by the clearance sonar 201a is an obstacle intended for driving assistance, that is, whether the detected object is adhesion matter, such as snow.

In step S203, the driving assistance ECU 10 (obstacle determination unit 103) determines whether a time (detection time) during which the object detected by the clearance sonar 201a has been continuously detected exceeds the predetermined time T2th. When the object has been continuously detected for a certain time (predetermined time T1th) from when the object has been detected at a close range (within the predetermined distance D0), because the host vehicle has been continuously able to travel without a collision with the close-range object, it may be determined that the detected object is adhesion matter. The detection time may include an index that indicates the continuity of a time during which the object has been detected, that is, for example, (the number of) intervals in which the object has been detected by the clearance sonar 201a. When the object has not been detected temporarily in a certain interval, the detection time may be reset to 0 or the time of the interval in which the object has not been detected may be shortened. That is, as in the case of the first embodiment, assuming, for example, the case where no distance information has been obtained because of noise, temporary communication error, or the like, the definition of the detection time may be loosened such that the detection time does not become 0 at once when the object has not been detected temporarily.

When the detection time is longer than the predetermined time T2th in step S203, that is, when it has been determined in step S203 that the object detected by the clearance sonar 201a is adhesion matter, the process proceeds to step S204. When the detection time is shorter than or equal to the predetermined time T2th, that is, when it has been determined that the object detected by the clearance sonar 201a is not adhesion matter, the process returns to step S201, and repeats the flowchart of step S201 to step S203.

In step S204, the driving assistance ECU 10 (control amount computing unit 104) suppresses driving assistance for avoiding a collision. Step S204 is similar to step S105 shown in FIG. 2 according to the first embodiment, so the description is omitted.

In step S205, the driving assistance ECU 10 (obstacle determination unit 103) determines whether the object determined as adhesion matter is cleared (not detected anymore). When it has been determined in step S205 that the object determined as adhesion matter is cleared, the process proceeds to step S206. When it has been determined that the object (adhesion matter) is not cleared, determination of step S205 is repeated until the object (adhesion matter) is cleared, and a state where driving assistance for avoiding a collision is suppressed (prohibited) is continued.

In step S206, the suppressed (prohibited) driving assistance for avoiding a collision is cancelled. The process returns to step S201, and waits until an object at a close range is detected.

Next, the operation of the driving assistance apparatus 1 (driving assistance ECU 10) according to the present embodiment will be described. The operation specific to the second embodiment will be mainly described.

The driving assistance ECU 10 changes a condition for determining whether the detected object is adhesion matter (predetermined condition) on the basis of a vehicle speed, and suppresses driving assistance for avoiding a collision with the object detected in the case where the predetermined condition is satisfied (the object is adhesion matter). Specifically, the above-described predetermined condition for determining whether the detected object is adhesion matter is whether the time (detection time) during which the detected object has been continuously detected exceeds the predetermined time T2th, and the predetermined time T2th is changed on the basis of the vehicle speed. That is, the predetermined time T2th extends as the vehicle speed increases. Thus, as in the case of the first embodiment, it is possible to eliminate inconvenience that it is determined whether a detected object is adhesion matter under the same condition for both in the case where the vehicle speed is high and in the case where the vehicle speed is low.

Third Embodiment

Next, a third embodiment will be described.

The present embodiment mainly differs from the first embodiment in that it is determined whether a detected object is adhesion matter on the basis of whether a distance that the host vehicle has traveled in a state where the detected object has been continuously detected exceeds a predetermined distance TD3th and the predetermined distance TD3th is changed on the basis of the speed of the host vehicle. Hereinafter, like reference numerals denote similar component elements to those of the first embodiment, and the difference will be mainly described.

The system configuration of the driving assistance apparatus 1 according to the present embodiment is shown in FIG. 1 as in the case of the first embodiment, so the description thereof is omitted.

Next, a driving assistance flowchart that is executed by the driving assistance apparatus 1 according to the present embodiment, particularly, a flowchart from determination as to whether the object detected by the clearance sonars 201a to 201d is an obstacle intended for driving assistance to suppression of driving assistance, will be described.

FIG. 5 is a flowchart that illustrates the operation of the driving assistance apparatus 1. The processing routine shown in FIG. 5 may be started from when the ignition of the vehicle on which the driving assistance apparatus 1 is mounted is turned on and may be executed while the ignition is on. The processing routine shown in FIG. 5 may be executed at intervals (predetermined intervals) at which an ultrasonic wave is transmitted or received during operation of the clearance sonars 201a to 201d. The processing routine shown in FIG. 5 may be executed independently of distance information regarding each of the clearance sonars 201a to

201d. Hereinafter, the process that is executed on the distance information associated with the clearance sonar 201a will be described as an example.

As in the case of the first embodiment, in parallel with the flowchart shown in FIG. 5, driving assistance (intervening to generate braking force, intervening to suppress driving force, issuing an alarm that prompts brake operation, or the like) in the case where an object has been detected by the clearance sonars 201a to 201d is being carried out.

In step S301, the driving assistance ECU 10 (obstacle determination unit 103) determines whether an object has been detected by the clearance sonar 201a at a close range (within the predetermined distance D0). This step is similar to step S101 shown in FIG. 2 according to the first embodiment, so the description is omitted.

In step S301, when the distance information including the target distance shorter than or equal to the predetermined distance D0 has been obtained, the process proceeds to step S302; otherwise, the process in the current interval ends, and enters a standby state where the process of step S301 is repeated until distance information shorter than or equal to the predetermined distance D0 is obtained.

In step S302, the driving assistance ECU 10 (obstacle determination unit 103) sets (changes) a predetermined distance TD3th on the basis of the speed of the host vehicle based on the wheel speed information input from the brake ECU 70, and then the process proceeds to step S303. The predetermined distance TD3th is a determination threshold for determining in the next step S303 whether the detected object is adhesion matter. Specifically, the predetermined distance TD3th may be set so as to extend as the vehicle speed increases. The predetermined distance TD3th may be set so as to approach to, for example, a distance to the object at the time when the clearance sonar 201a starts detecting the object as the vehicle speed decreases.

Step S303 is a step of determining whether the object detected by the clearance sonar 201a is an obstacle intended for driving assistance, that is, whether the detected object is adhesion matter, such as snow.

In step S303, the driving assistance ECU 10 (obstacle determination unit 103) determines whether the distance (travel distance) that the host vehicle has traveled in a state where the object detected by the clearance sonar 201a has been continuously detected exceeds the predetermined distance TD3th. When the object has been continuously detected a certain distance (predetermined distance TD3th) from when the object has been detected at a close range (within the predetermined distance D0), because the host vehicle has been continuously able to travel without a collision with the close-range object, it may be determined that the detected object is adhesion matter.

When the travel distance exceeds the predetermined distance TD3th in step S303, that is, when it has been determined in step S303 that the object detected by the clearance sonar 201a is adhesion matter, the process proceeds to step S304. When the travel distance is shorter than or equal to the predetermined distance TD3th, that is, when it has been determined that the object detected by the clearance sonar 201a is not adhesion matter, the process returns to step S301, and repeats the flowchart of step S301 to step S303.

In step S304, the driving assistance ECU 10 (control amount computing unit 104) suppresses driving assistance for avoiding a collision. Step S304 is similar to step S105 shown in FIG. 2 according to the first embodiment, so the description is omitted.

In step S305, the driving assistance ECU 10 (obstacle determination unit 103) determines whether the object determined as adhesion matter is cleared (not detected anymore). When it has been determined in step S305 that the object determined as adhesion matter is cleared, the process proceeds to step S306. When it has been determined that the object (adhesion matter) is not cleared, determination of step S305 is repeated until the object (adhesion matter) is cleared, and a state where driving assistance for avoiding a collision is suppressed (prohibited) is continued.

In step S306, the suppressed (prohibited) driving assistance for avoiding a collision is cancelled. The process returns to step S301, and waits until an object at a close range is detected.

Next, the operation of the driving assistance apparatus 1 (driving assistance ECU 10) according to the present embodiment will be described. The operation specific to the third embodiment will be mainly described.

The driving assistance ECU 10 changes a condition for determining whether the detected object is adhesion matter (predetermined condition) on the basis of a vehicle speed, and suppresses driving assistance for avoiding a collision with the object detected in the case where the predetermined condition is satisfied (the object is adhesion matter). Specifically, the above-described predetermined condition for determining whether the detected object is adhesion matter is whether the distance (travel distance) that the host vehicle has traveled in a state where the detected object has been continuously detected exceeds the predetermined distance TD3th, and the predetermined distance TD3th is changed on the basis of the vehicle speed. That is, the predetermined distance TD3th extends as the vehicle speed increases. Thus, as in the case of the first embodiment, it is possible to eliminate inconvenience that it is determined whether a detected object is adhesion matter under the same condition for both in the case where the vehicle speed is high to some extent and in the case where the vehicle speed is low to some extent. That is, when the vehicle speed is high to some extent, the travel distance within one cycle of each of the clearance sonars 201a to 201d is long, so, for example, even when rain is detected only in a certain cycle, the travel distance of the host vehicle can exceed the predetermined distance TD3th during the cycle. Therefore, rain detected only in a certain cycle can be determined as adhesion matter. In contrast, the predetermined distance TD3th is changed so as to extend as the vehicle speed increases, so it is possible to prevent the above-described erroneous determination. Driving assistance for avoiding a collision is not suppressed as a result of erroneous determination, so it is possible to effectively carry out driving assistance. When the predetermined distance TD3th is extended in correspondence with the case where the vehicle speed is high for the purpose of preventing the above-described erroneous determination, there can be inconvenience that a time required until it is determined whether a detected object is adhesion matter extends in the case where the vehicle speed is low. However, by changing the predetermined distance TD3th on the basis of the vehicle speed, such the inconvenience does not occur, and it is possible to early determine whether a detected object is adhesion mater in the case where the vehicle speed is low to some extent, so it is possible to reduce a feeling of strangeness experienced by the driver.

The embodiments of the invention are described in detail above; however, the invention is not limited to those specific embodiments, and may be modified or changed in various forms within the scope of the invention recited in the appended claims.

For example, in the above-described embodiments, the processing flowchart for suppressing driving assistance on the basis of whether a detected object is adhesion matter may be executed also when an object at a location farther than the predetermined distance D0 has been detected. For example, not only an object detected at a close range but an object detected within a detectable range by the clearance sonars 201a to 201d may be subjected to determination as to whether it is adhesion matter, and driving assistance may be suppressed on the basis of the determination. Thus, it is possible to more carefully carry out determination as to whether a detected object is adhesion matter, and, for example, unexpected adhesion matter, or the like, may also be handled.

In the above-described embodiments, the process of determining whether there is adhesion matter is executed in association with suppression of driving assistance for avoiding a collision. Instead, for example, it may be independently periodically determined whether there is adhesion matter to any one of the clearance sonars 201a to 201d. That is, it may be determined whether there is adhesion matter to any one of the clearance sonars 201a to 201d through step S101 to step S104 in the processing routine shown in FIG. 2, step S201 to step S203 in the processing routine shown in FIG. 4 or step S301 to step S303 in the processing routine shown in FIG. 5.

In the above-described embodiments, the ultrasonic sensors are used. The invention is also applicable to the case where other means capable of detecting an object (for example, a millimeter wave radar, a laser radar, a stereo camera, or the like) is used. In this case, as in the case of the above-described clearance sonars 201, the number of means arranged for detecting an obstacle is not limited, and an appropriate number of means for detecting an obstacle may be provided so as to be able to detect an obstacle around the host vehicle.

In the above-described embodiments, the clearance sonars 201 are provided outside the vehicle cabin, such as the front bumper, the rear bumper, or the like. Instead, the means for detecting an obstacle may be provided in the vehicle cabin as long as it is possible to detect an obstacle around the host vehicle and detect a distance to the obstacle, or the like. For example, when a stereo camera is used as the means for detecting an obstacle, the stereo camera may be provided near a front windshield, a rear windshield or a side window in the vehicle cabin so as to be able to capture an outdoor image around the host vehicle.

The invention claimed is:

1. A driving assistance apparatus to be mounted on a vehicle, comprising:
a clearance sonar to detect an object outside the vehicle and acquire object information including a distance to the object;
a vehicle speed sensor to detect a vehicle speed of the vehicle; and
an electronic control unit configured to
carry out driving assistance associated with the object based on the object information when the object has been detected by the clearance sonar, and
suppress the driving assistance when the object has been continuously detected by the clearance sonar and a predetermined condition that is changed based on the vehicle speed detected by the vehicle speed sensor is satisfied, wherein
the condition includes a first condition and a second condition,
the first condition is that a distance that the vehicle has traveled in a state where the object has been continuously detected by the clearance sonar exceeds a predetermined distance,
the second condition is that a time during which the object has been continuously detected by the clearance sonar exceeds a predetermined time, and
the electronic control unit is configured to select the first condition when the vehicle speed detected by the vehicle speed sensor is lower than or equal to a predetermined vehicle speed, and select the second condition when the vehicle speed detected by the vehicle speed sensor exceeds the predetermined vehicle speed.

2. The driving assistance apparatus according to claim 1, wherein
the predetermined distance is a distance to the object at the time when the clearance sonar starts detecting the object.

3. The driving assistance apparatus according to claim 1, wherein
the clearance sonar is configured to transmit a detection wave to an outside of the vehicle, detect the object outside the vehicle based on a reflected wave of the detection wave, and acquire the object information.

4. A driving assistance apparatus to be mounted on a vehicle, comprising:
a clearance sonar to detect an object outside the vehicle and acquire object information including a distance to the object;
a vehicle speed sensor to detect a vehicle speed of the vehicle; and
an electronic control unit configured to
carry out driving assistance associated with the object based on the object information when the object has been detected by the clearance sonar, and
suppress the driving assistance when the object has been continuously detected by the clearance sonar and a predetermined condition that is changed based on the vehicle speed detected by the vehicle speed sensor is satisfied, wherein
the predetermined condition is that a time during which the object has been continuously detected by the clearance sonar exceeds a predetermined time, and the predetermined time is changed based on the vehicle speed detected by the vehicle speed sensor.

5. The driving assistance apparatus according to claim 4, wherein
the predetermined time extends as the vehicle speed detected by the vehicle speed sensor increases.

6. A driving assistance apparatus to be mounted on a vehicle, comprising:
a clearance sonar to detect an object outside the vehicle and acquire object information including a distance to the object;
a vehicle speed sensor to detect a vehicle speed of the vehicle; and
an electronic control unit configured to
carry out driving assistance associated with the object based on the object information when the object has been detected by the clearance sonar, and
suppress the driving assistance when the object has been continuously detected by the clearance sonar and a predetermined condition that is changed based on the vehicle speed detected by the vehicle speed sensor is satisfied, wherein
the predetermined condition is that a distance that the vehicle has traveled in a state where the object has been continuously detected by the clearance sonar exceeds a predetermined distance, and the predetermined distance is changed based on the vehicle speed detected by the vehicle speed sensor.

7. The driving assistance apparatus according to claim 6, wherein the predetermined distance extends as the vehicle speed detected by the vehicle speed sensor increases.

* * * * *